Aug. 22, 1944.   F. F. TRACY   2,356,131
SUPPORT FOR SERVICE TRAYS
Filed June 17, 1942   2 Sheets-Sheet 1
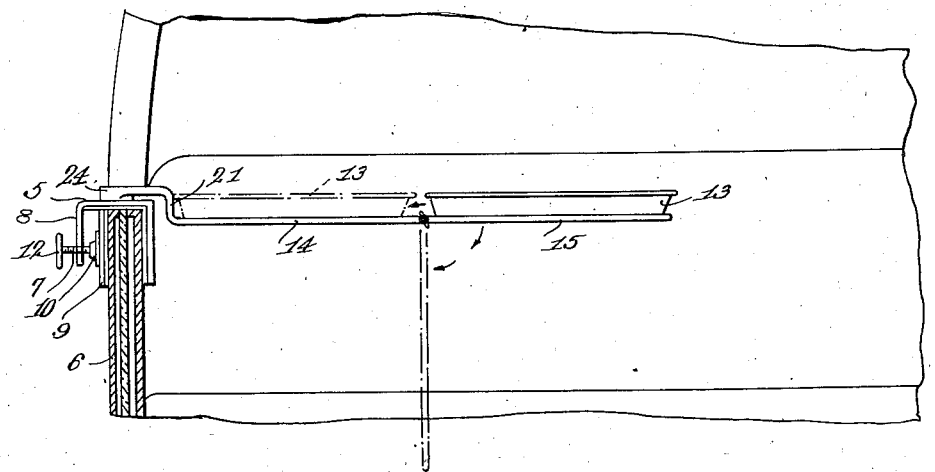
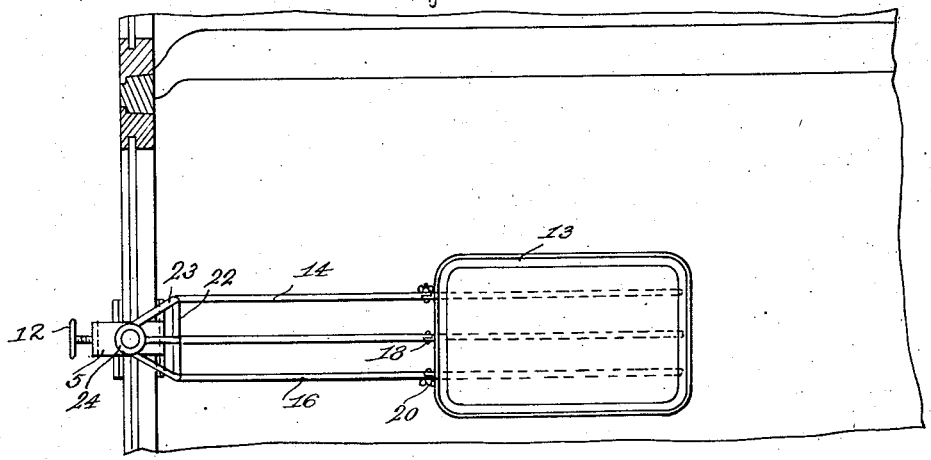
Inventor
Florence F Tracy
By Ralph Burch
Attorney Aug. 22, 1944.  F. F. TRACY  2,356,131
SUPPORT FOR SERVICE TRAYS
Filed June 17, 1942  2 Sheets—Sheet 2
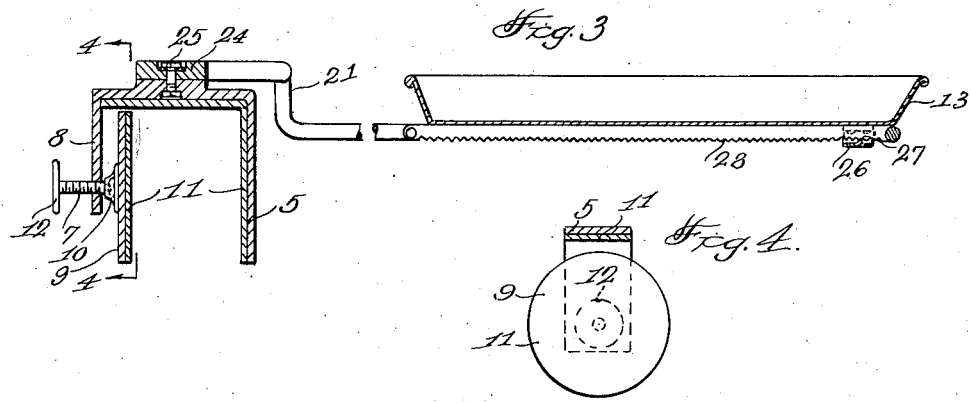
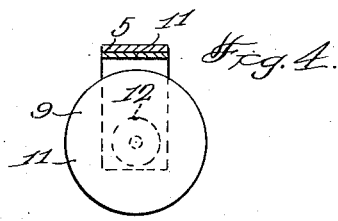
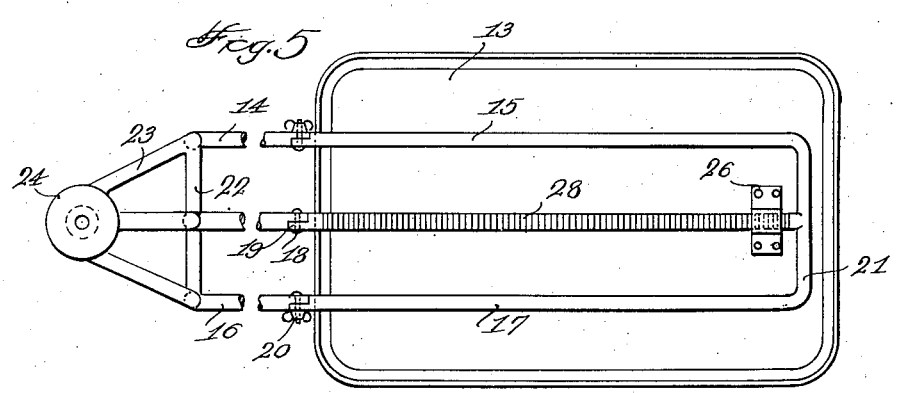
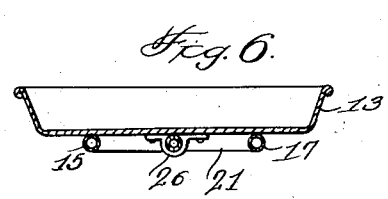
Inventor
Florence F. Tracy
By Ralph Burch
Attorney Patented Aug. 22, 1944

2,356,131

UNITED STATES PATENT OFFICE 2,356,131

SUPPORT FOR SERVICE TRAYS

Florence F. Tracy, Daytona Beach, Fla.

Application June 17, 1942, Serial No. 447,401

1 Claim. (Cl. 311—22)

This invention relates to an improved support for food service trays adapted for mounting on the side wall or lower window sill of an automobile body.

It is an object of the invention to provide a support mounted to extend horizontally from the side wall of an automobile body and capable of horizontal swinging movement, the support having an extension hingedly connected to the end of the main section for vertical swinging movement to permit the length of the support to be extended for supporting food service trays in a convenient position with respect to the occupants of the automobile.

A further object of the invention resides in providing a device of the above-mentioned character which is simple and durable in construction, efficient and convenient in use, and inexpensive to manufacture.

Other objects and advantages of the invention will be apparent during the course of the following description.

In the accompanying drawings forming a part of this specification and in which like numerals are employed to designate like parts throughout the same, Fig. 1 is a vertical transverse section of the side wall of an automobile body showing my improved support attached thereto, Fig. 2 is a top plan view of the support, Fig. 3 is a side elevation of the support with parts in longitudinal section, Fig. 4 is a section taken on line 4—4 of Fig. 3, Fig. 5 is an enlarged fragmentary bottom plan view of the support, and, Fig. 6 is a cross section taken on line 6—6 of Fig. 5.

In the drawings wherein for the purpose of illustration I have shown a preferred embodiment of my invention, the numeral 5 denotes a U-shaped clamp designed to straddle the lower window sill of an automobile body 6. A screw 7 is threaded in an opening through the outer leg 8 of the clamp and a clamping plate 9 is connected to the inner end of the screw by a swivel joint 10. The clamping face of the plate 9 and body engaging faces of the clamp 5 are lined with suitable soft material 11 to prevent marring of the body. A handle 12 is formed on the outer end of the screw 7 for turning the screw to move the clamping plate 9 into and out of clamping engagement with the side of the body.

The frame for supporting the service tray 13 is composed of a main section 14 and an extension 15. Both the main section and extension consist of three spaced parallel bars 16 and 17, the main section and extension being pivotally connected together at one end by pivot pins 18 extending transversely through the lap joints 19. The pivot pins of the outer bars are equipped with wing nuts 20 for securing the extension in a horizontal position. The free ends of the bars 17 forming the extension 15 are connected by a cross bar 21 and the free ends of the bars 16 forming the main section are bent upwardly at right angles to form a shoulder 21 and are connected together by a cross bar 22. A plurality of arms 23 extend from the cross bar 22 in a horizontal plane, the two outer arms converging toward the center arm with all the arms joined to a circular plate 24 which is pivotally mounted on top of the clamp 5 by a pivot bolt 25.

The service tray 13 is mounted to slide longitudinally of the supporting frame having a U-shaped bracket 26 attached to its bottom adjacent one end adapted to straddle the center bars of the main section and extension. A detent 27 is carried by the bracket 26 adapted to engage notches 28 formed along the bottom of the center bars whereby the tray is secured in its adjusted position.

In use, the supporting frame is detachably attached to the body of the automobile by the clamp 5 with the main section 14 extending in a horizontal plane transversely of the body. When the service tray 13 is resting on the main section, as shown in dotted lines in Fig. 1, the extension 15 hangs down from the main section. By swinging the extension 15 to a horizontal plane and tightening the wing nuts 20 the length of the supporting frame is extended and the tray 13 may be moved longitudinally of the frame until it rests on the extension. Thus, it is seen the supporting frame is readily adjustable to permit the service tray to be conveniently positioned with respect to the occupants being served in the automobile.

The present invention is an improvement over the invention disclosed in applicant's co-pending application Serial Number 406,709, filed in 1941.

It is to be understood that the form of my invention herein shown and described is to be taken as a preferred example of the same and that certain changes in the shape, size and arrangement of the parts may be made without departing from the spirit of the invention or the scope of the subjoined claim.

Having thus described my invention, I claim:

An automobile service tray support comprising a horizontal frame composed of spaced parallel bars, a clamp adapted to engage a part of the automobile, the ends of the bars forming said frame being joined together at one end and pivotally connected to said clamp to permit said frame to swing in a horizontal plane, said bars being off-set downwardly to form an abutment adjacent said clamp to limit the horizontal swinging movement of said frame, and a tray slidably connected to one of said bars to permit said tray to slide longitudinally of the frame between the abutment and outer end of the frame.

FLORENCE F. TRACY.